United States Patent
Schupp et al.

(10) Patent No.: US 8,700,471 B2
(45) Date of Patent: Apr. 15, 2014

(54) UNIFIED ONSCREEN ADVERTISEMENT SYSTEM FOR AVDDS

(75) Inventors: William Arthur Schupp, San Diego, CA (US); Ludovic Etienne Douillet, Escondido, CA (US); Aran London Sadja, San Diego, CA (US); Nicole Rebong, Cardiff-by-the Sea, CA (US)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 13/116,279

(22) Filed: May 26, 2011

(65) Prior Publication Data

US 2012/0304221 A1    Nov. 29, 2012

(51) Int. Cl.
*G06Q 10/00* (2012.01)

(52) U.S. Cl.
USPC .................................................. 705/14.73

(58) Field of Classification Search
USPC ..................................................... 705/14.73
See application file for complete search history.

(56) References Cited

U.S. PATENT DOCUMENTS

| 5,740,549 A * | 4/1998 | Reilly et al. ............... 705/14.42 |
| 7,792,696 B1 * | 9/2010 | Philyaw et al. ............. 705/14.1 |
| 2010/0121693 A1 * | 5/2010 | Pacana ......................... 705/14.4 |

* cited by examiner

*Primary Examiner* — Naresh Vig
(74) *Attorney, Agent, or Firm* — John L. Rogitz

(57) ABSTRACT

A client-server architecture allows audio video display device (AVDD) devices to obtain advertisements. A gateway server contacted by the AVDD pursuant to AVDD energization sends a link to the AVDD to a link server, from which the AVDD downloads only links to secondary ad servers. The gateway server also sends one or more links to the AVDD to primary ad servers. The AVDD presents ads from the primary and secondary ad server simultaneously.

18 Claims, 7 Drawing Sheets

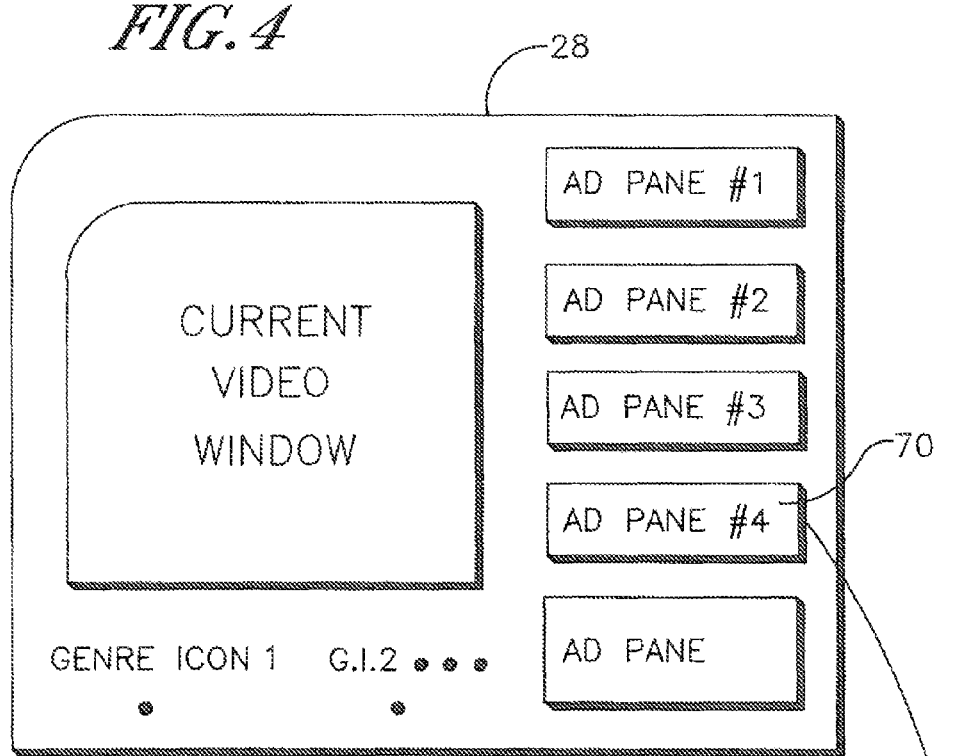
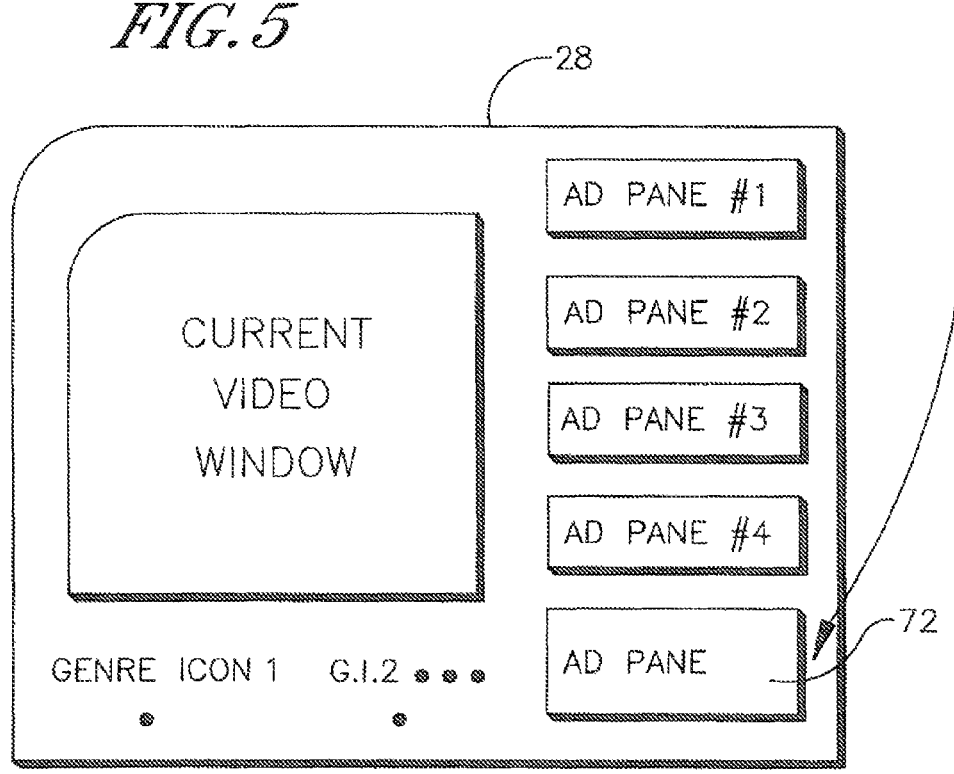

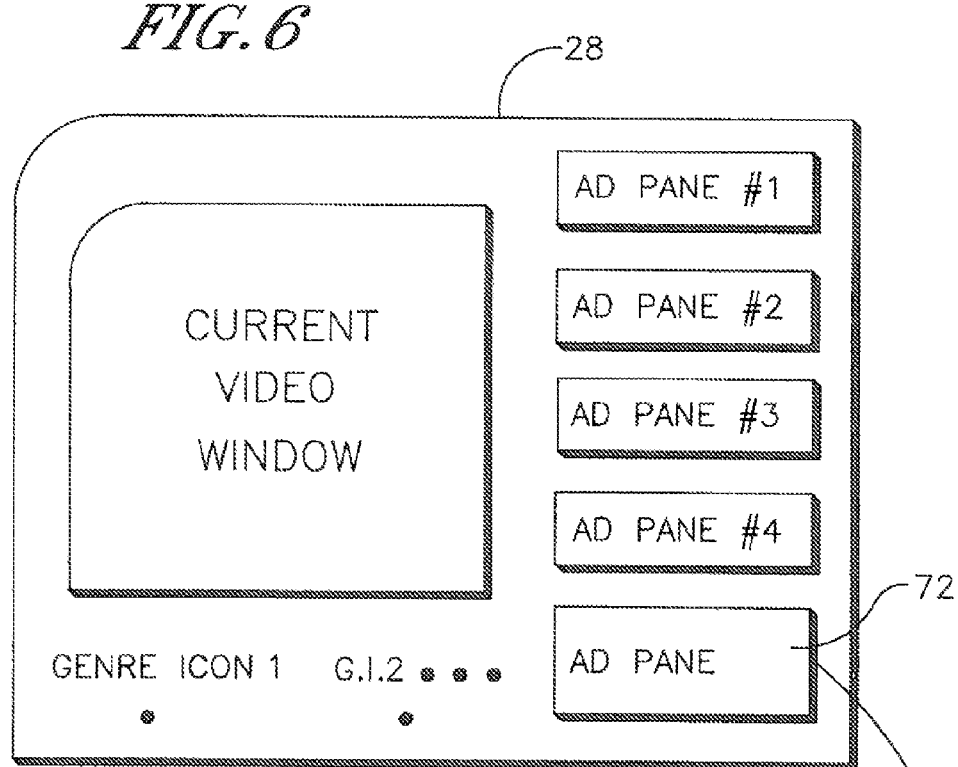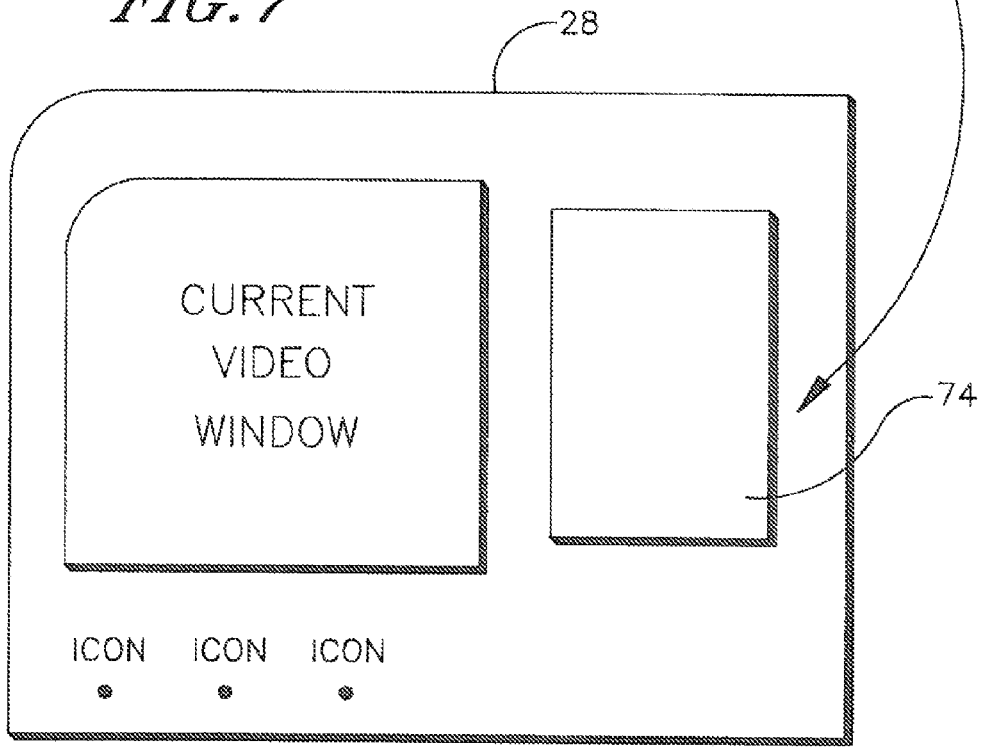

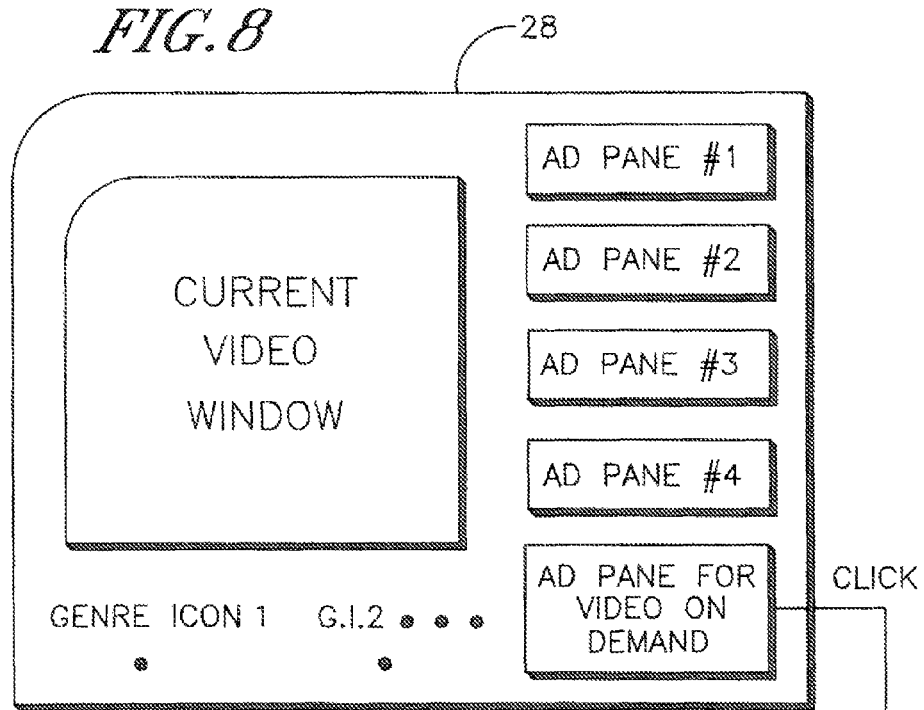
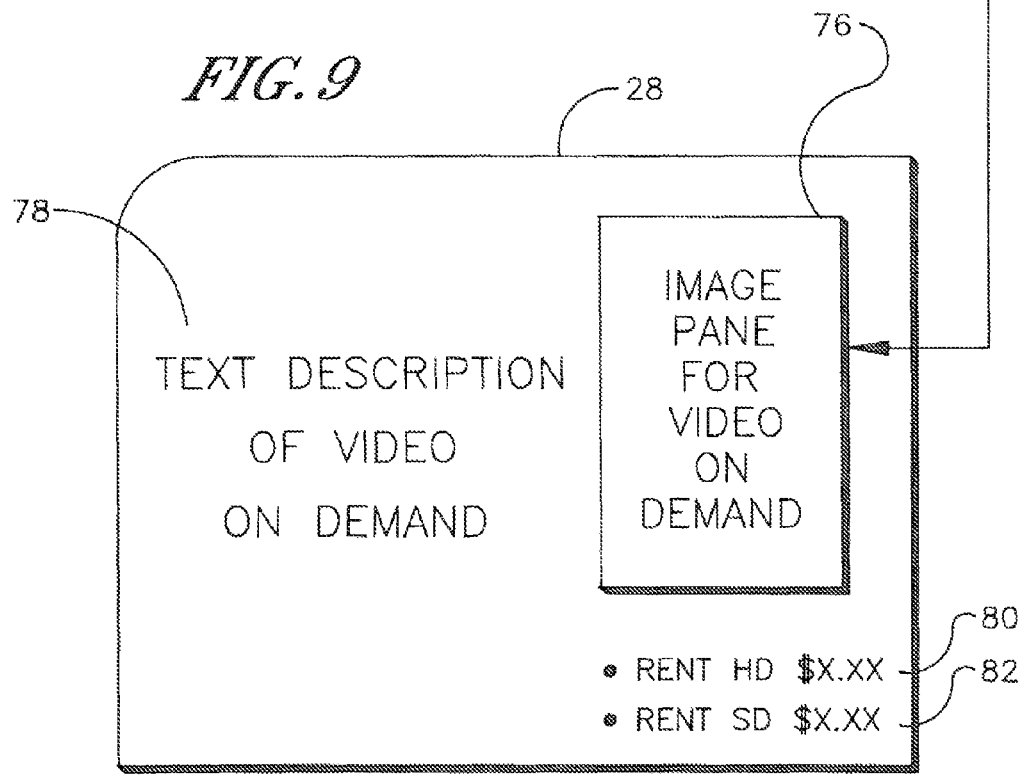

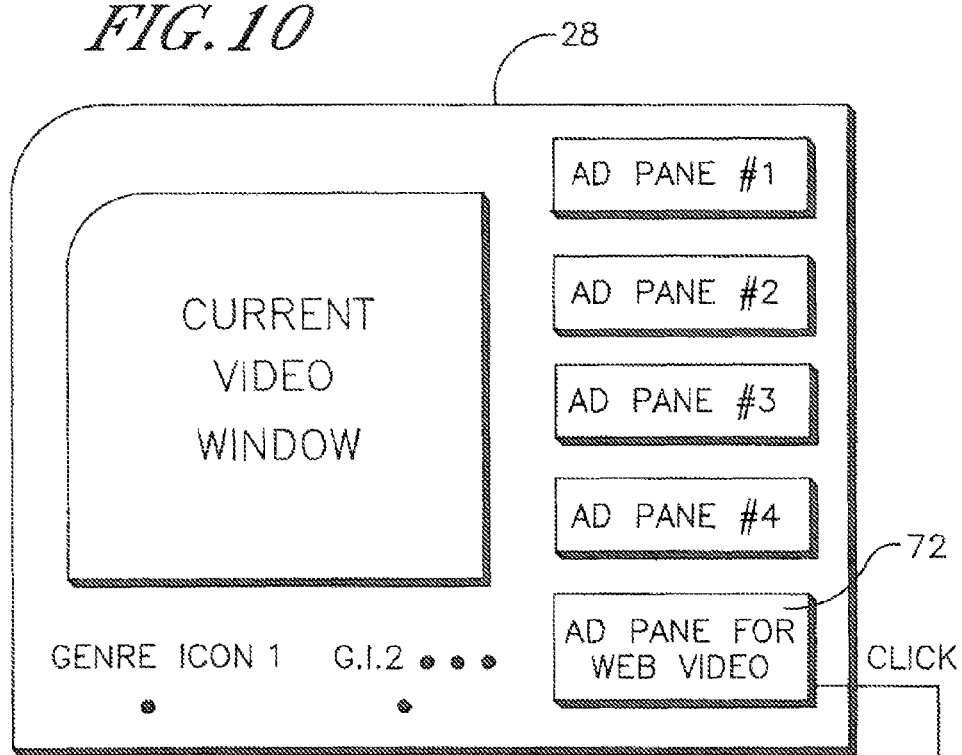
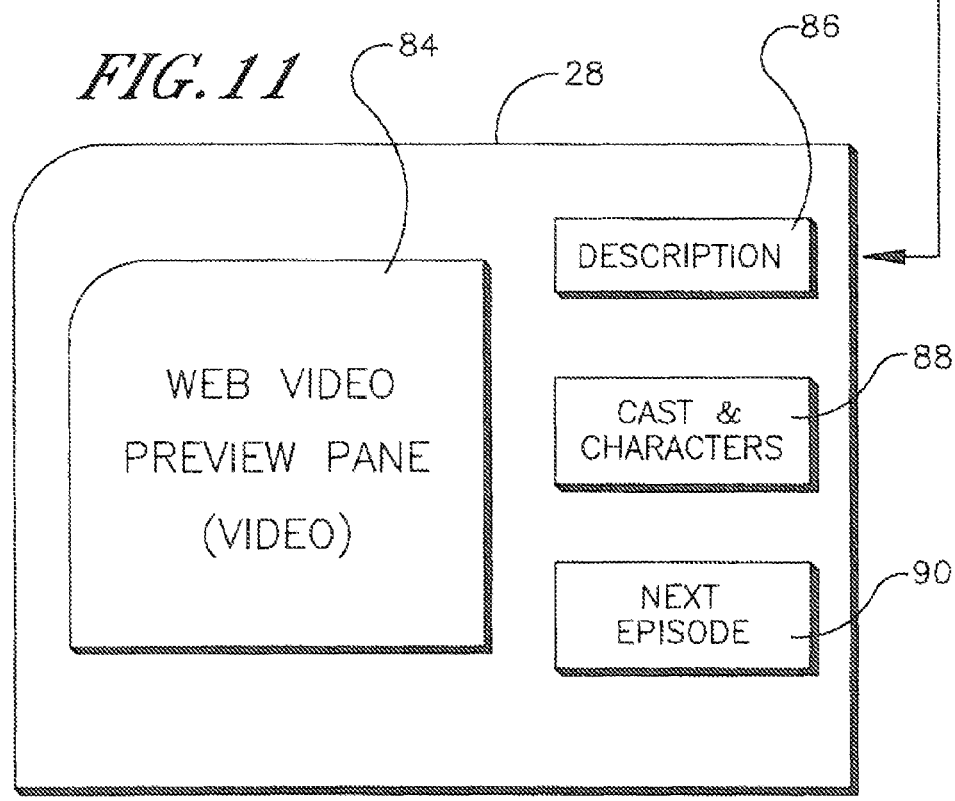

1

UNIFIED ONSCREEN ADVERTISEMENT SYSTEM FOR AVDDS

I. FIELD OF THE INVENTION

The present application relates generally to unified onscreen advertisement systems for audio video display device (AVDD) devices.

II. BACKGROUND OF THE INVENTION

With more and more AVDDs connecting to the Internet, the opportunities for downstream revenue from advertising embedded within the digital content and on-screen applications are increasing dramatically. Note that: "advertisement" includes sales advertisements for new products and services as well as notifications that items such as purchasable software updates are available.

As understood herein, however, current advertising systems limit the opportunities to increase downstream revenue for the manufacturers of AVDDs. This is because advertisers typically contract with Internet advertising agencies to develop advertisements that are provisioned through channels that do not include the manufacturers of the AVDDs. While limited revenue may be realized by, e.g., populating advertising campaigns into electronic program guides (EPGs) embedded in some TV models, obstacles remain to expanding advertising revenue to AVDD manufacturers beyond the current EPG paradigm.

SUMMARY OF THE INVENTION

According to principles set forth further below, the manufacturer of an AVDD can provide a gateway server whose network or Internet address is preprogrammed into the AVDD during manufacturing or downloaded post-sale to the AVDD. Whenever the AVDD is powered up it can contact the gateway server and receive pointers from the gateway server, referred to herein as links, to two types of servers, along with ad position placement instructions.

One type of server is a link server associated with an intermediary ad broker who has contracted with ad providers and with the manufacturer of the AVDD to arrange to place ads from the providers onto the AVDD in accordance with a business case. The link server returns no ads to the AVDD but only links to ad servers with whom the link server entity has contracted. Using the links from the link server, the AVDD accesses the ad servers pointed to by the link server and downloads and places ads on its display in accordance with the ad position placement instructions dictated by the gateway server.

The second type of server pointed to by the gateway server is an ad server, and the gateway server can point to more than one ad server. Using the links from the gateway server, the AVDD accesses the ad servers pointed to by the gateway server and downloads and places ads on its display in accordance with the ad position placement instructions dictated by the gateway server.

In this way, the manufacturer of the AVDD has flexibility to enter into contractual relationships with both the intermediary ad broker and directly with select ad providers themselves, to present ads on the AVDD which can generate revenue from mere display as well as additional revenue whenever an ad is selected by a viewer. Selection of an ad can in turn link the AVDD to a source of AV content affiliated with the selected ad. The manufacturer of the AVDD also retains control over where on the AVDD display the ads are presented so that the manufacturer may impose differential pricing for ads depending on the screen position at which the ads are placed.

In another aspect, a method includes receiving, at an audio video display device (AVDD) from a gateway server, a link to a link server and downloading from the link server to the AVDD only links to secondary ad servers. The method then includes downloading at the AVDD at least a first ad from a secondary ad server. Also, the method includes receiving at the AVDD from the gateway server one or more links to primary ad servers, downloading at the AVDD at least one a second from the primary ad server, and presenting on the AVDD the first and second ads simultaneously.

In another aspect, an audio video display device (AVDD) device has a processor, a display controlled by the processor, and a computer readable storage medium bearing instructions executable by the processor to, responsive to energization of the AVDD, access an Internet gateway server. The processor receives from the gateway server a link to a link server and at least one link to at least one primary advertisement server. In turn, the processor accesses the link server using the link thereto received from the gateway server to download from the link server at least one link to at least one secondary advertisement server but not to download from the link server any advertisements. In this way the processor accesses the primary advertisement server using the link thereto received from the gateway server to download and display at least a first advertisement on the AVDD while also accessing the secondary advertisement server using the link thereto received from the link server to download and display on the AVDD at least a secondary advertisement in addition to and simultaneous with the first advertisement.

As contemplated in some embodiments the processor causes the display to present a current video window in which is presented a currently selected AV program encompassing a majority of the display and a column of relatively thin ad panes. The thin ad panes present respective ads including at least the first and second advertisements. The column of thin ad panes can be presented to the right of the current video window when viewing the display and a relatively thick ad pane of the same width as the relatively thin ad panes but thicker in a vertical dimension defined by the display than the relatively thin ad panes can be presented juxtaposed with the column of thin ad panes.

If desired, the processor, responsive to viewer focus on an ad in a relatively thin ad pane, may enlarge the ad and move it into the relatively thick ad pane. Similarly, the processor, responsive to viewer focus on an ad in the relatively ad thick pane, may enlarge the ad and moves it into a single larger pane on the display. The single larger pane can encompass a screen region previously occupied by the relatively thin ad panes and relatively thick ad pane.

If an ad in the relatively thick ad pane is an ad for a video-on-demand (VOD) program, the processor, responsive to selection of the ad for a VOD program, may replace the relatively thick and thin ad panes and current video window with an image pane showing images related to the VOD program, a textual description of the VOD program, and at least one selector element selectable to purchase or rent the VOD program. On the other hand, if the ad in the relatively thick ad pane is for an Internet-sourced program, responsive to selection of the ad the processor can link to an AV program server.

The details of the present invention, both as to its structure and operation, can best be understood in reference to the accompanying drawings, in which like reference numerals refer to like parts, and in which:

BRIEF DESCRIPTION OF THE DRAWINGS

FIGS. 3-11 are screen shots of the AVDD illustrating example features.

DETAILED DESCRIPTION OF THE PREFERRED EMBODIMENT

Figure 1:
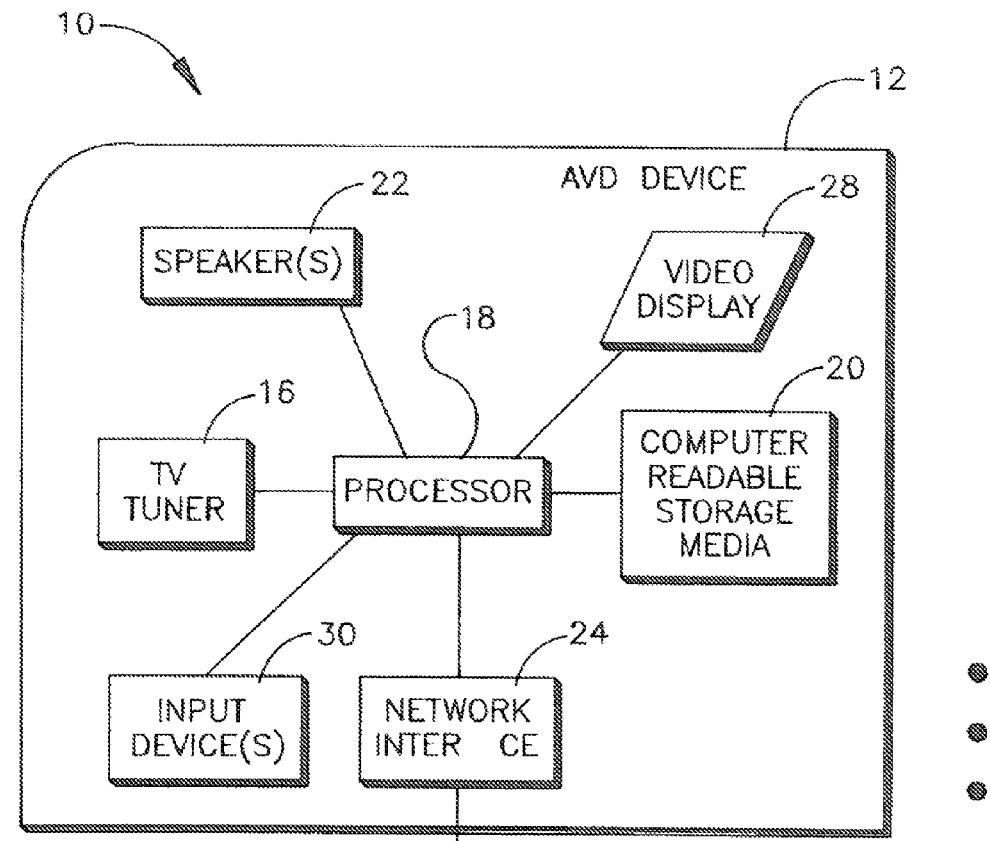
FIG. 1 is a block diagram of a non-limiting example system in accordance with present principles.
Figure 1:
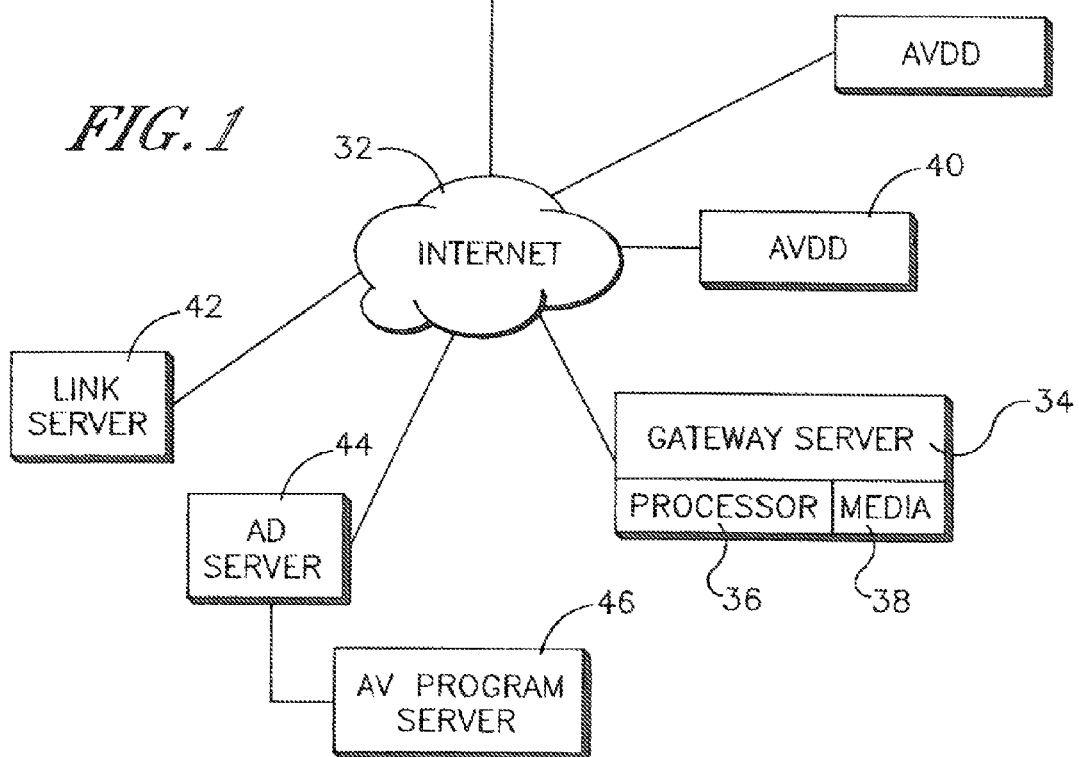

Referring initially to the non-limiting example embodiment shown in FIG. 1, a system 10 includes a audio video display device (AVDD) 12 such as a portable TV including a TV tuner 16 communicating with one or more processors 18 accessing one or more tangible computer readable storage media 20 such as disk-based or solid state storage bearing logic and data in accordance with present principles. The AVDD 12 can output audio on one or more speakers 22. The AVDD 12 can receive streaming video from the Internet using a network interface 24 such as a wired or wireless modem communicating with the processor 12 which may execute a software-implemented browser stored on the medium 20. Video may be presented under control of the processor 18 on a video display 28. Used commands to the processor 18 may be received from an input device 30 such as but not limited to wired or wireless keyboards, keypads, touch sensor array under the display 28, mice, or other pointing and clicking device such as a wireless TV remote control, etc. AVDDs other than a TV may be used, e.g., smart phones, game consoles, personal digital organizers, notebook computers and other types of computers, etc.

As shown in FIG. 1, the AVDD 12 can communicate through the Internet 32 or other wide area network with a gateway server 34 having one or more processors 36 accessing one or more computer readable storage media 38 bearing logic and data in accordance with present principles. Other AVDDs 40 likewise can communicate with the gateway server 34 through the Internet. The gateway server 34 typically is affiliated with the manufacturer of the AVDDs 12, 40.

FIG. 1 also shows that an a link server 42 may communicate with the Internet for purposes to be shortly disclosed, as well as one or more advertisement ("ad") servers 44 from various ad providers and storing the content of Internet advertisements. Some of the ads may be associated with AV programming and when selected as discussed below can cause the AVDD to access an AV program server 46 which is affiliated with (or which may be the same as) the ad server 44.

Figure 2:
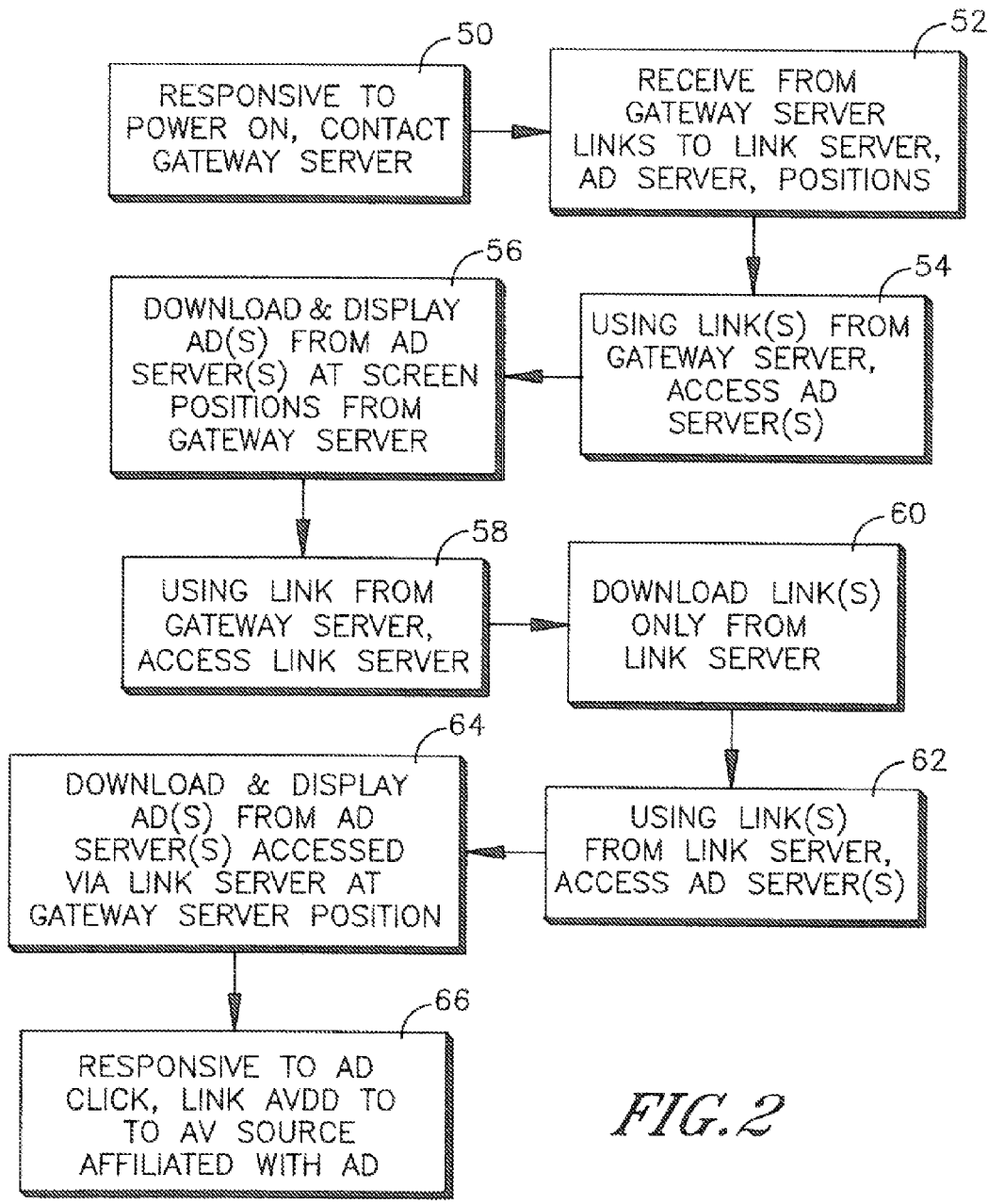
FIG. 2 is a flow chart showing example logic that can be executed by the AVDD.

Now referring to FIG. 2, at block 50 the AVDD 12 contacts the gateway server 34. This may be done responsive to every energization of the AVDD. As can be appreciated the AVDD 12 contacts the gateway server 34 on the Internet via the network interface 24.

Proceeding to block 52 the AVDD receives from the gateway server 34 a link to the link server 42 and one or more links to one or more respective advertisement servers 44. In one embodiment the links are hyperlinks typically including IP addresses of the servers. Also, the AVDD can receive ad position placement instructions from the gateway server 34. For example, the gateway server 34 can instruct the AVDD 12 to present the first two ads obtained via the link server 42 at display 28 positions N and M and to present the first ad obtained directly from an ad server 44 whose link is provided by the gateway server 34 at display position P, wherein N, M, and P are integers and are discussed further below.

Moving to block 54, the AVDD accesses the advertisement server(s) 44 whose link(s) were received from the gateway server 34 using the links from the gateway server. For clarity of description without loss of generality the ad servers whose links are received by the AVDD direct from the gateway server 34 can be referred to as "primary" ad servers. At block 56 the AVDD 12 downloads from the primary ad server(s) 44 advertisements, presenting the ads on the display 28 in accordance with the ad position placement instructions from the gateway server 34 as more fully described below.

Also, the AVDD 12 accesses the link server 42 at block 58 using the link thereto received from the gateway server 34. At block 60 the AVDD 12 downloads from the link server 42 one or more links) to respective advertisement server(s) 44. For clarity of description without loss of generality the ad servers whose links are received by the AVDD from the link server 42 can be referred to as "secondary" ad servers. Note that the AVDD 12 does not download ads per se from the link server 42, only links to additional ad servers.

Proceeding to block 62, using the link(s) from the link server 42, the AVDD accesses the corresponding secondary ad server(s) 44. Accordingly, at block 64 the AVDD 12 downloads ads from secondary the ad server(s) 44 whose links were received from the link server 42, presenting them on the display 28 in accordance with the ad position placement instructions from, the gateway server 34 as more fully described below. Should a viewer of the AVDD device 12 select a displayed ad as by clicking on the ad using a TV remote control, at block 66 the AVDD can be linked to the AV program server 46 that is affiliated with the selected ad to present an AV program from the server 46 on the display 28.

Figure 3:
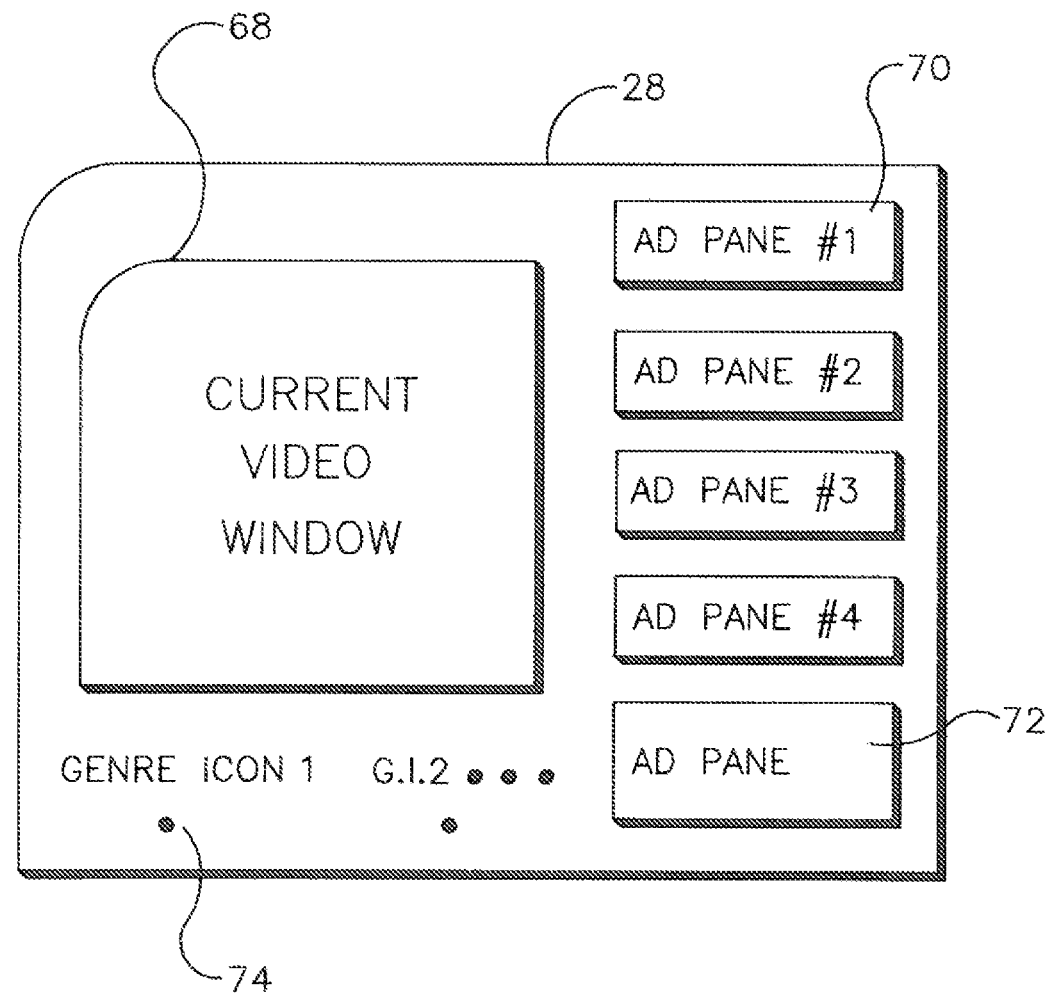

Now referring to FIG. 3, a screen is shot of the display 28 of the AVDD 12 which includes a current video window 68 in which is presented a currently selected AV program received through the network interface 24, TV tuner 16, cable head end, satellite receiver, etc. The current video window 68 may encompass the majority of the display area of the display 28 as shown.

Also, to the right of the current video window 68 in the example shown in FIG. 3 a column of relatively thin ad panes 70 may be presented, for example four panes 70 numbered 1-4 as shown, at the bottom of which column may be a single relatively thick ad pane 72 of the same width as the relatively thin ad panes 70 but being thicker in the vertical dimension defined by the display 28 than the relatively thin ad panes 70. Beneath the current video window 68 a row of genus selection icons 74 may be arranged from left to right on the display 28 and may be selected by a viewer manipulating, e.g., a TV RC to select a particular genre of video (favorites, history, Internet, disk player, recommendations, etc.) to present on the display 28 in, e.g., the relatively thick ad pane 72. For example, an ad for a recommended video may be presented in the relatively thick ad pane 72 when the "recommendation" icon 74 is selected.

According to present principles, ads from secondary ad servers 44 linked to via links from the link server 42 may be presented in predetermined ad panes 70/72 on the display 28 according to the ad position placement instructions from the gateway server 34. For example, the ad position placement instructions from the gateway server 34 may instruct the AVDD 12 to place ads from secondary ad servers 44 linked to via links from the link server 42 in panes 1, 3, and 4. On the other hand, ads from primary ad servers 44 linked to directly from the gateway server 34 may be presented in other predetermined ad panes 70/72 on the display 28 according to the ad position placement instructions from the gateway server 34. For example, the ad position placement instructions from the gateway server 34 may instruct the AVDD 12 to place ads from primary ad servers 44 linked to directly from the gateway server 34 in pane 2.

FIGS. 4 and 5 show that if the viewer focuses on a particular ad, in this case, the ad in relatively thin pane #4 by, e.g., hovering a screen cursor over the ad, after a predetermined time period or responsive to selection of, e.g., the up arrow on a TV RC the same ad is enlarged and moved into the relatively thick pane 72. Similarly, FIGS. 6 and 7 show that if the viewer focuses on the ad in the relatively thick pane 72 by, e.g., hovering a screen cursor over the ad, after a predetermined time period the same ad is enlarged and presented in a single larger pane 74 that encompasses the screen region previously occupied by the panes 70, 72.

Additional features may be appreciated in reference to FIGS. 8 and 9. Suppose the ad in the relatively thick pane 72 is an ad for a video-on-demand (VOID) program (FIG. 8). If a user selects the ad in the relatively thick pane 72 by, e.g., clicking on it the presentation of FIG. 9 may be invoked responsive to the selection on the display 28. In FIG. 9 the panes 70, 72 and current video window 68 are replaced by an image pane 76 showing images related to the VOD program. Also, in place of the current video window 68 a textual description 78 of the VOID program appears. If desired a selector element 80 may be provided that can be selected to purchase or rent the VOD program in high definition for one price while a selector element 82 may be provided that can be selected to purchase or rent the VOD program in standard definition for a typically lower price.

Yet again, FIGS. 10 and 11 illustrate that if the ad in the relatively thick pane 72 is for an Internet-sourced program and the ad is selected (FIG. 10), responsive thereto the screen presentation of FIG. 11 is invoked along with a browser. The AVDD 12 links to an AV program server 46 affiliated with the selected ad by accessing a hyperlink embedded in the ad. A web video pane 84 can be presented on the display 28 generally where the current video window 68 had been presented, with the web video pane 84 presenting a clip of the selected web program. A text description pane 86 in which a text description of the web program appears can be presented to the right of the web video pane 84 and below the pane 86 a pane 88 may be presented which described the case and characters of the selected web video. Below the pane 88 in turn a pane 90 may be presented in, which information on an upcoming (ensuing) episode of the web video appears.

While the particular UNIFIED ONSCREEN ADVERTISEMENT SYSTEM FOR AVDDs is herein shown and described in detail, it is to be understood that the subject matter which is encompassed by the present invention is limited only by the claims.

What is claimed is:

1. Audio video display device (AVDD) device comprising:
   processor configured for communicating with a display; and
   computer readable storage medium bearing instructions executable by the processor to:
   access an Internet gateway server;
   receive from the gateway server a link server link to a link server and at least one primary link to at least one primary advertisement server;
   access the link server using the link server link received from the gateway server to download from the link server at least one secondary link to at least one secondary advertisement server but not to download from the link server any advertisements;
   access the primary advertisement server using the primary link received from the gateway server to download and present at least a first advertisement on the AVDD; and
   access the secondary advertisement server using the secondary link received from the link server to download and present on the AVDD at least a secondary advertisement in addition to and simultaneously with the first advertisement.

2. The AVDD of claim 1, wherein the processor when accessing the instructions is configured to cause the display to present a current video window in which is presented a currently selected AV program encompassing a majority of the display and a column of relatively thin ad panes, the thin ad panes presenting respective ads including at least the first and second advertisements.

3. The AVDD of claim 2, wherein the column of thin ad panes is presented to the right of the current video window when viewing the display.

4. The AVDD of claim 2, where in the processor when accessing the instructions is configured to cause the display to present a relatively thick ad pane of the same width as the relatively thin ad panes but being thicker in a vertical dimension defined by the display than the relatively thin ad panes, the relatively thick ad pane presenting an ad and being presented juxtaposed with the column of thin ad panes.

5. The AVDD of claim 4, wherein the processor when accessing the instructions is configured to, responsive to viewer focus on an ad in a relatively thin ad pane, enlarge the ad and move it into the relatively thick ad pane.

6. The AVDD of claim 4, wherein the processor when accessing the instructions is configured to, responsive to viewer focus on an ad in the relatively ad thick pane, enlarge the ad and move it into a single larger pane on the display, the single larger pane encompassing a screen region previously occupied by the relatively thin ad panes and relatively thick ad pane.

7. The AVDD of claim 4, wherein an ad in the relatively thick ad pane is an ad for a video-on-demand (VOD) program, and the processor when accessing the instructions is configured to, responsive to selection of the ad for a VOD program, replace the relatively thick and thin ad panes and current video window with an image pane showing images related to the VOD program, a textual description of the VOD program, and at least one selector element selectable to purchase or rent the VOD program.

8. The AVDD of claim 4, wherein the ad in the relatively thick ad pane is for an Internet-sourced program and when accessing the instructions the processor is configured to, responsive to selection of the ad, link to an AV program server.

9. Gateway server comprising:
   processor accessing a computer readable storage medium to receive signals from an audio video display device (AVDD) over the Internet, the processor when accessing the computer readable storage medium being configured for, in response:
   sending to the AVDD a link pointing to a link server associated with an intermediary ad broker who has contracted with ad providers and with a manufacturer of the AVDD to arrange to place ads from the providers onto the AVDD, the link server returning no ads to the AVDD but only links to ad servers, wherein using the links from the link server, the AVDD can access the ad servers pointed to by the link server and download and place ads on its display;

sending to the AVDD ad position placement instructions, the AVDD presenting the ads according to the ad placement instructions;

sending to the AVDD one or more links to respective one or more ad servers, wherein using the links from the gateway server, the AVDD can access the ad servers pointed to by the gateway server and download and place ads therefrom on its display in accordance with the ad position placement instructions.

10. Method comprising:

receiving, at an audio video display device (AVDD) from a gateway server a link to a link server;

downloading from the link server to the AVDD only links to secondary ad servers;

downloading at the AVDD at least a first ad from a secondary ad server;

receiving at the AVDD from the gateway server one or more links to primary ad servers;

downloading at the AVDD at least one second ad from the primary ad server; and presenting on the AVDD the first and second ads simultaneously.

11. The method of claim 10, comprising:

receiving at the AVDD from the gateway server ad placement instructions; and arranging the ads on the AVDD according to the ad placement instructions.

12. The method of claim 10, comprising presenting on the AVDD a current video window in which is presented a currently selected AV program encompassing a majority of a display of the AVDD and a column of relatively thin ad panes, the thin ad panes presenting respective ads including at least the first and second ads.

13. The method of claim 12, wherein the column of thin ad panes is presented to the right of the current video window when viewing the AVDD.

14. The method of claim 12, comprising presenting a relatively thick ad pane of the same width as the relatively thin ad panes but being thicker in a vertical dimension defined by the AVDD than the relatively thin ad panes, the relatively thick ad pane presenting an ad and being presented juxtaposed with the column of thin ad panes.

15. The method of claim 14, comprising, responsive to viewer focus on an ad in a relatively thin ad pane, enlarging the ad and moving the into the relatively thick ad pane.

16. The method of claim 14, comprising, responsive to viewer focus on an ad in the relatively ad thick pane, enlarging the ad and moving the ad into a single larger pane on the AVDD, the single larger pane encompassing a screen region previously occupied by the relatively thin ad panes and relatively thick ad pane.

17. The method of claim 14, wherein an ad in the relatively thick ad pane is an ad for a video-on-demand (VOD) program, and the method includes, responsive to selection of the ad for a VOD program, replacing the relatively thick and thin ad panes and current video window with an image pane showing images related to the VOD program, a textual description of the VOD program, and at least one selector element selectable to purchase or rent the VOD program.

18. The method of claim 14, wherein the ad in the relatively thick ad pane is for an Internet-sourced program and responsive to selection of the ad the method comprising linking to an AV program server.

* * * * *